US007007806B2

(12) United States Patent
MacNeil

(10) Patent No.: US 7,007,806 B2
(45) Date of Patent: *Mar. 7, 2006

(54) METHOD AND APPARATUS FOR SEPARATING A PROTEIN MEMBRANE AND SHELL MATERIAL IN WASTE EGG SHELLS

(75) Inventor: Joseph H. MacNeil, State College, PA (US)

(73) Assignee: The Penn State Research Foundation, State College, PA (US)

( * ) Notice: Subject to any disclaimer, the term of this patent is extended or adjusted under 35 U.S.C. 154(b) by 57 days.

This patent is subject to a terminal disclaimer.

(21) Appl. No.: 10/302,712

(22) Filed: Nov. 21, 2002

(65) Prior Publication Data

US 2003/0136711 A1   Jul. 24, 2003

Related U.S. Application Data

(63) Continuation-in-part of application No. 09/757,988, filed on Jan. 10, 2001, now abandoned, which is a continuation of application No. 09/040,563, filed on Mar. 18, 1998, now Pat. No. 6,176,376.

(60) Provisional application No. 60/040,816, filed on Mar. 18, 1997.

(51) Int. Cl.
*A01K 43/04* (2006.01)

(52) U.S. Cl. ............... 209/510; 209/172; 209/172.5; 209/173

(58) Field of Classification Search ............ 209/510, 209/172, 172.5, 173, 159, 158; 366/261, 366/186, 194, 195, 241
See application file for complete search history.

(56) References Cited

U.S. PATENT DOCUMENTS

| 1,945,860 A | 2/1934 | Lafler |
| 3,645,708 A | 2/1972 | Grady |
| 3,761,026 A | 9/1973 | Rohmer |
| 3,822,015 A | 7/1974 | Hsieh et al. |
| 3,899,419 A | 8/1975 | Emanuel |
| 3,955,532 A | 5/1976 | Hall et al. |
| 4,081,375 A | 3/1978 | Deal et al. |
| 4,082,856 A | 4/1978 | Zwiep |
| 4,396,158 A | 8/1983 | Olsen |
| 5,045,323 A | 9/1991 | Michalek |
| 5,215,267 A | 6/1993 | Taylor |
| 5,415,875 A | 5/1995 | Kakoki |
| 5,417,858 A | 5/1995 | Derrick et al. |
| 6,176,376 B1 * | 1/2001 | MacNeil ............ 209/510 |

FOREIGN PATENT DOCUMENTS

| JP | 3258709 | 3/1990 |
| JP | 435673 | 5/1990 |
| JP | 03045264 A | 2/1991 |
| JP | 08173838 A | 7/1996 |

* cited by examiner

*Primary Examiner*—Donald P. Walsh
*Assistant Examiner*—Jonathan R. Miller
(74) *Attorney, Agent, or Firm*—Reed Smith LLP

(57) ABSTRACT

A method and apparatus for abrading the membrane portion of waste egg shells from the hard mineral portion thereof, is provided. The linking structure between the membrane and shell is initially abraded such that the membrane particles and shell particles can be passively dissociated thereafter.

27 Claims, 2 Drawing Sheets

METHOD AND APPARATUS FOR SEPARATING A PROTEIN MEMBRANE AND SHELL MATERIAL IN WASTE EGG SHELLS

CLAIM OF PRIORITY

This application is a continuation-in-part of U.S. patent application Ser. No. 09/757,988 filed Jan. 10, 2001 now abandoned; which is a continuation of Ser. No. 09/040,563, filed Mar. 18, 1998 now issued as U.S. Pat. No. 6,176,376, issued Jan. 23, 2001 and claims benefit of Ser. No. 60/040,816 filed Mar. 18, 1997.

BACKGROUND OF THE INVENTION

1. Field of the Invention

The present invention relates to a method and apparatus for efficiently and simply separating a membrane from the inside of egg shells, and, in particular, a method and apparatus for separating a protein membrane from waste egg shells.

2. Description of the Related Art

Nearly 30% of all eggs consumed today in the United States are used to manufacture processed egg products that are used as ingredients in other processed foods and various food service operations. For example, the albumen ("egg white") and egg yolk may be recovered to manufacture liquid egg products of various types. In other instances, the albumen and egg yolk may be dried to form a more shelf-stable product (e.g., powdered eggs).

The use of eggs by the processed egg sector of the industry is increasing markedly, according to the United States Department of Agriculture. In 1984, the egg processing industry utilized 25.6 million cases of eggs to manufacture liquid and dry egg products. In 1995, 47.5 million cases of eggs were utilized. Estimates for 1997 indicate that more than 50 million cases of eggs were utilized in a variety of further processed egg products.

The waste egg shells amassed from such processing are usually subjected to further processing (e.g., such as with a centrifuge) in order to recover residual albumen which adheres to the egg shells, which can be sold to the pet food industry. Nevertheless, the egg shells, whether further processed or not, are largely disposed of as a waste product.

Based on 1997 estimates, therefore, more than 120,000 tons of unprocessed egg shell waste were generated. More specifically, a survey conducted in collaboration with the United Egg Producers indicated that almost 50% of U.S. egg producers each generate 1000 to 3000 tons of egg shell waste each year. Among the survey respondents, 26.6% used the egg shell waste as fertilizer, 21.1% used it as a feed ingredient, 26.3% disposed of it in dumps as waste, and 15.8% put it to "other" use(s). Among the respondents identifying disposal costs, almost three-quarters reported disposal costs between $25,000 and $100,000 per year. In view of the significant disposal costs for what is conventionally totally a waste product, and additionally, in view of current environmental practicalities which are decreasing the availability of local disposal sites (thereby further increasing disposal cost), it will be readily appreciated that finding a significant use for egg shell waste would have important financial and environmental, benefits.

It is well-known that the egg shell of a chicken, comprises an inorganic external mineral portion and an internal organic matrix upon which the mineral portion is built. The mineral portion is primarily calcitic calcium carbonate. The organic matrix generally comprises an inner and outer membrane layer, each of which are comprised of a network of proteinaceous fibers, upon which the mineral portion of the shell is formed.

The presence of hydroxyproline in hydrolsates of the membrane layers suggest that the membrane layers include collagen as a component of the fiber structure. Biochemical and immunological testing has confirmed this. It has been established that of the total proteinaceous content of the membrane structure of an egg shell, about 10% is collagen.

Moreover, genetic collagen variants have been identified in the shell membranes, with the outer shell membrane being predominately type I and the inner shell membrane being types I and V. In addition, type X collagen has been found in both the inner and outer shell membranes through immunohistochemical analysis. It is important to recognize the presence of collagen in eggshell membranes because of its potential monetary value.

The presence of collagen in the shell membranes is interesting because of the increasing demand for collagen. Bovine, and to a lesser extent, human, collagen is becoming relatively commonly used in a variety of applications, especially in the biomedical field. For example, a collagen glue made from human collagen is known for filling corneal wounds. Also, research in ongoing in producing skin and tissue replacement products made from collagen. Unfortunately, the cost of such collagen based products is very high (at least about $1,000 per gram, or about $454,000 per pound), although such costs are considered economically acceptable, at least in medical applications, in view of the overall cost of medical treatment.

Based on estimates for 1997 egg consumption, as discussed above, approximately 120,000 tons of egg shell waste would yield 110,000 tons of egg shell and 10,000 tons of membrane. Taking into account that about 10% of the membrane is collagen, this would yield 1,000 pounds of collagen.

In addition, use of bovine collagen raises an issue as to the possible transmission of bovine spongiform encephalopathy (commonly known as "mad cow disease"). Although, as a practical matter, the risk of mad cow disease transmission is very small, the mere perception of possible risk creates a need for private, well-isolated, and expensive herds.

Another problem with bovine collagen is the risk of autoimmune and allergic reactions caused thereby, since approximately 2% to 3% of the population is allergic in this regard. Although, this would appear to be a small percentage, the problem is likely to increase as the use of bovine collagen products becomes more common.

SUMMARY OF THE INVENTION

In view of the foregoing, it is an object of the present invention to provide a method and apparatus for simply and economically separating the membrane layer(s) from the inside of waste egg shells, thereby permitting use of both the "clean" egg shells (i.e., egg shells separated from the membrane) and the membrane in further applications. This simultaneously diminishes the environmental impact associated with waste egg shell disposal while offering economic benefit from use of the resultant products.

In particular, it is an object of the present invention to provide an especially simple method and apparatus, as discussed above, thereby reducing costs for the operation thereof, which, in turn, maximizes the economic benefit gained therefrom.

In keeping with the aforementioned objects of the invention, a separating apparatus according to the present invention includes, generally, a tank holding a liquid. The tank preferably contains plain water, which is relatively inexpensive and environmentally "friendly." The separating apparatus also may include a reducing device for yielding egg shell waste particles of a certain size. Once the waste egg shell particles are conveyed into the tank, the egg shell particles and membrane particles attached thereto passively dissociate from one another. The egg shell particles, being heavier than the membrane particles, settle on the bottom of the tank where, generally, they are collected and delivered to a recovery device. The membrane particles are relatively light and therefore tend to remain suspended in the liquid in the tank. According to one aspect of the present invention, liquid containing the suspended membrane particles is removed from the tank and the membrane particles are at least dewatered, thereby yielding a moist bulk membrane product which can be further processed.

A method according to the present invention includes, generally, the steps of processing waste egg shells to yield dissociated egg shell particles and membranes, directing the waste egg shell particles into a tank containing a liquid, thereby separating the waste egg shell particles into clean egg shell particles and membrane particles, collecting the membrane particles entrained in the liquid, and collecting and/or drying the clean egg shell particles.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

The foregoing and other objectives of the present invention will become more apparent from the detailed description given hereinafter. However, it should be understood that the detailed description and specific examples, while indicating preferred embodiments of the invention, are given by way of illustration and example only, since various changes and modifications within the spirit and scope of the invention will become apparent to those skilled in the art from this detailed description.

The present invention will be described hereinbelow with reference to the drawings appended hereto.

Figure 1:
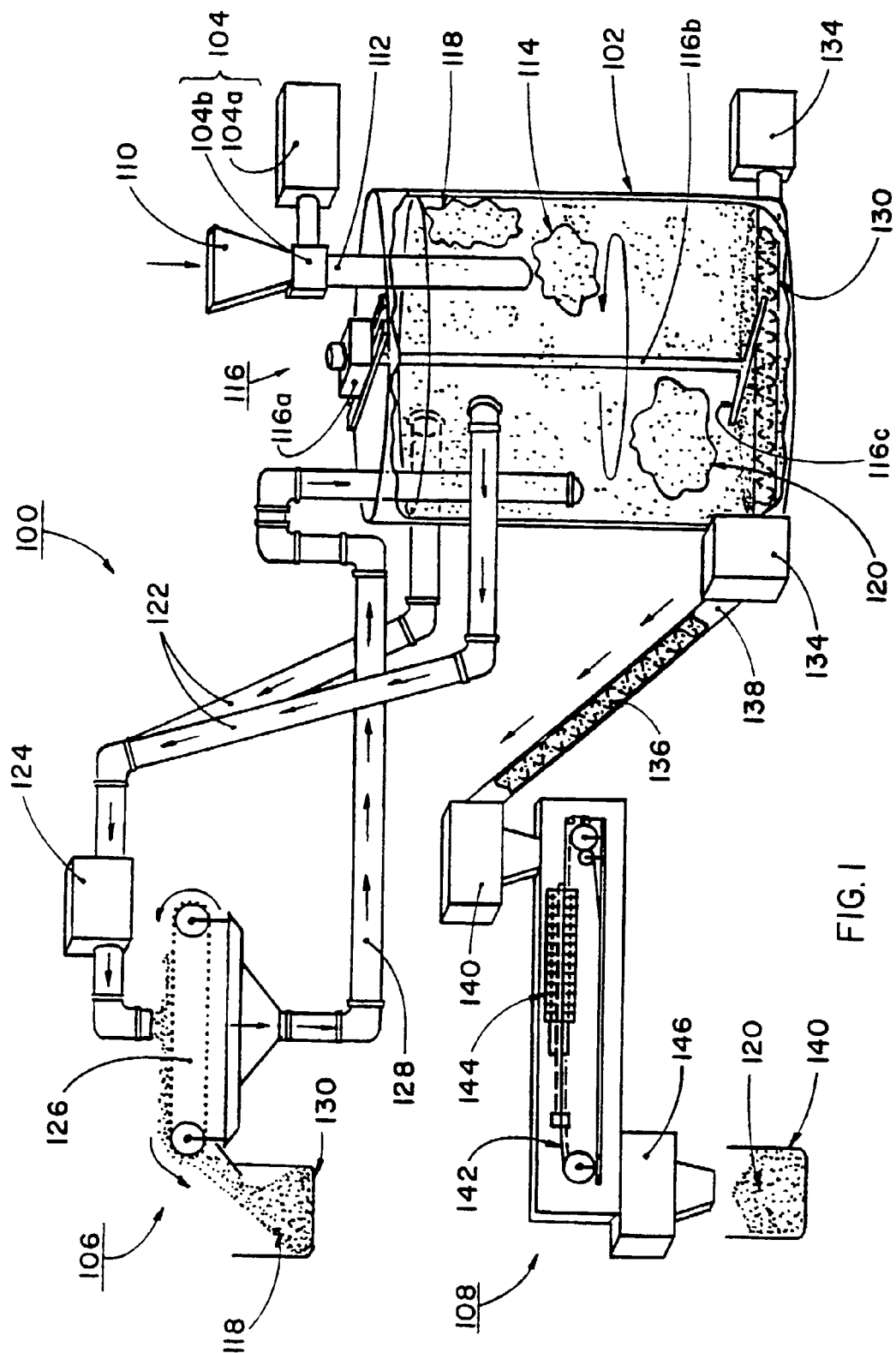
FIG. 1 illustrates a system for separating membrane particles from egg shell particles according to the present invention.

FIG. 1 illustrates an example of a separating apparatus 100 according to the present invention.

Generally, separating apparatus 100 includes a tank 102, a reducing device 104 for receiving waste egg shells and outputting waste egg shell particles of a particular size (discussed further below), a first recovery device 106 for recovering a first component of the waste egg shells after separation, and a second recovery device 108 for recovering a second component of the waste egg shells after separation. Both first and second recovery devices 106 and 108 communicate with tank 102.

More specifically, waste egg shells are received in a hopper 110 from where they are guided into a reducing device 104 which characteristically outputs egg shell waste particles of a particular size. A particularly preferable range of particle sizes is between about 0.5 mm to about 4.0 mm with respect to the largest linear dimension of each particle (i.e., the longest edge-to-edge dimension thereof, whether continuous or discontinuous).

Reducing device 104 according to the present invention includes, generally, a driving motor (schematically indicated at 104*a*) and a cutting head (schematically indicated at 104*b*). It is a particular feature of the present invention that reducing device 104 not only provides a cutting action by which waste egg shells are reduced to particles between 0.5 mm and 4.0 mm, but also provides an abrasive effect whereby the linking structure attaching the egg shell membranes to the egg shell is disrupted. This disruption allows the membrane particles to passively dissociate from the egg shell particles in the subsequent process that takes place in tank 102 (discussed hereinbelow).

A particularly useful example of a reducing device 104 according to the present invention is commercially available from Urschel Laboratories Inc. under the trademark COMITROL®. The COMITROL® reducing device is known in the size reduction field, especially in food sciences.

It will be readily appreciated that a different, known reducing device may be used according to the invention as long as the aforementioned abrasive effect is still provided (either in the operation of the alternate reducing device or additionally as part of the separating process) to cause the linking structure disruption discussed above.

In a preferred embodiment, the reducing device 104 abrades the membranes from the egg shell such that the linking structure is sufficiently disrupted so that no further active disruption is needed to separate the abraded membrane particle from the egg shell particles. Preferably, after exiting the abrasive reducing device 104, only passive dissociation is required to separate the abraded membrane particles from the egg shell particles.

The waste egg shell particles 114 are conveyed from the reducing device 104 to tank 102 via a chute or conduit 112. Tank 102 is generally a flat bottomed tank. Its overall volume is highly dependent on the separating throughput desired. However, an example of a tank that is useful according to the present invention has a volume of between 80 to 100 gallons. Customarily, tank 102 contains at least plain water and, preferably, only plain water at room temperature.

According to the present invention, the waste egg shell particles 114 conveyed via chute 112 land in the water held in tank 102. Preferably, chute 112 extends below a surface of the water in tank 102, whereby the waste egg shell particles 114 are immediately entrained in the water below and away from conduit(s) 122 (for reasons discussed hereinbelow).

Because of the disruption of the linking structure between the egg shell and the membranes caused by reducing device 104, the membrane particles 118 become relatively easy to separate from the "clean" egg shell particles 120, especially as the waste egg shell particles 114 are subjected to gravity and settle onto the bottom of the tank 102. Substantially all of the waste egg shell particles 114 are passively disassociated in this manner into membrane particles 118 and clean egg shell particles 120.

Since the membrane particles 118 are much lighter than the clean egg shell particles 120, the membrane particles 118 tend to stay entrained in the water a longer time without settling. The clean egg shell particles 120 tend to settle onto the bottom of tank 102 because of their relatively greater weight.

Figure 2:
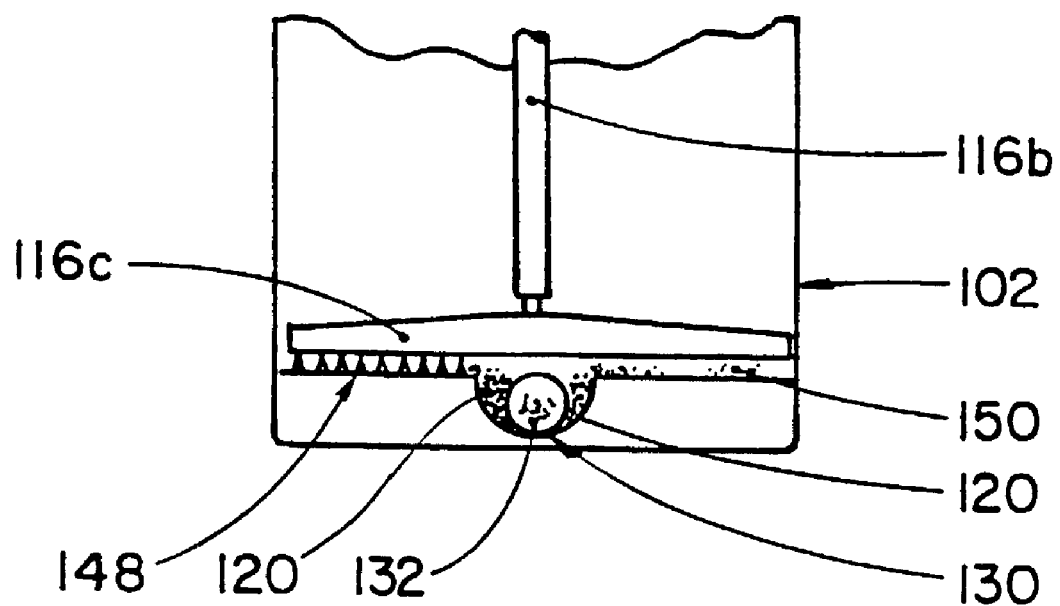
FIG. 2 illustrates a sweep arm mechanism for promoting membrane shell separation and for collecting clean shell particles, according to the present invention.

However, some of the membrane particles 118 may become "buried" under clean egg shell particles 120 which have settled on the bottom of tank 102. In order to free these membrane particles, (i.e., promote passive dissociation) the particles on the bottom of tank 102 are slowly stirred, using, for example, a sweep arm assembly 116. Sweep arm assembly 116 may include, for example, a motor unit 116*a*, a shaft 116*b* connected to motor unit 116*a*, and a sweep arm 116*c*. In a particular example of a sweep arm assembly 116, as illustrated in FIGS. 1 and 2, drive shaft 116*b* is driven to rotate by motor unit 116*a*. Drive shaft 116*b* is in turn connected to a midpoint of sweep arm 116*c*, which is disposed immediately above the bottom of tank Sweep arm 116*c* is rotated very slowly (e.g., 1 rev/min or less). This rotation disturbs the settled particles so that the membrane particles 118 are exposed from amidst clean egg shell particles 120. Since membrane particles 118 readily become entrained in the water, this stirring substantially recovers any membrane particles that settle onto the bottom of tank 102. However, due to the slow rotation of sweep arm 116*c*, the clean egg shell particles 120 are beneficially not stirred so vigorously that they too are swept upward into the water. This would tend to slow the process because it depends on the clean egg shell particles settling onto the tank bottom.

The water containing the entrained membrane particles 118 is suctioned out of tank 102 by a water pump 124, via one or more conduit(s) 122. As illustrated in FIG. 1, the inlet(s) to conduit(s) 122 are located relatively near the water line in tank 102 and relatively spaced apart from chute 112, so as to ensure that primarily entrained membrane particles 118, and not waste egg shell particles 114 or clean egg shell particles 120, are suctioned out of tank 102. Conduits 122 may be, for example, 2.0 inches to 2.5 inches in diameter. The membrane-containing water is, for example, screened on a mesh belt assembly 126 to dewater the membrane particles 118. The dewatered membranes are thereafter collected as a bulk product in a bin 130 or the like for further processing, such as drying.

The pumping capacity of water pump 124 is dependent on the particulars of the overall system, including, for example, the volume of water in the tank, the amount of egg shell waste input into the system, and the processing capacity of the first and second recovery devices 106 and 108. With the aforementioned example of tank 102 containing 80–100 gallons of water, pump 124 may have a pumping capacity of, for example, 20 gallons per minute.

It will be readily appreciated that the membrane particles 118 can be also dewatered by any number of conventional methods, such as, for example, a static screen (comprising, for example, at least two screens having different mesh sizes) instead of a mesh belt assembly.

The water collected in the process of dewatering membrane particles 118 is preferably recycled by sending it back to tank 102 via conduit 128, which may also be, for example, 2.0 inches to 2.5 inches in diameter. This reduces the resource requirements of the system and therefore reduces the costs of operation.

Moreover, the outlet of conduit 128 is arranged so as to further promote the passive dissociation of membrane particles 118 and clean egg shell particles 120. In an example arrangement, as illustrated in FIG. 1, the outlet of conduit 128 is arranged below the surface (water line) in tank 102. This permits the solution of abraded membrane particles 118, egg shell particles 120, and water coming into tank 102 to enter the water in tank 102 without excessive frothing caused by entrained air, as would occur if the water were poured into tank 102 from above the water surface.

It will be readily appreciated that the membrane particles 118 need not necessarily be dewatered, and may alternatively be collected in suspension. However, the water in tank 102 would need to be replenished accordingly, in the absence of water input via conduit 128.

As mentioned above, the clean egg shell particles 120, having been separated from membrane particles 118, settle to the bottom of tank 102, and are collected and transported to second recovery device 108. In one embodiment of the present invention, the bottom of tank 102 includes an elongate groove or depression 130 formed therein. Where tank 102 is round, as illustrated by way of example in FIG. 1, groove 130 preferably extends substantially completely across a diameter of tank 102. A first auger 132 is disposed in groove 130, and is driven to rotate by at least one auger motor 134.

In addition to stirring the mix of abraded membrane particles and clean egg shell particles settled on the bottom of tank 102, sweep arm 116*c* sweeps clean egg shell particles 120 into groove 130. As seen in FIG. 2, one side of sweep arm 116*c* is provided with a brush or rake-like structure 148, which loosely stirs the membrane and shell particles settled on the bottom of tank 102 to cause the membrane particles to become entrained in the water, as discussed hereinabove. The other side of sweep arm 116*c* may be provided with a flexible blade 150, which may be made from, for example, rubber or polytetrafluoroethylene, and which acts as a squeegee to sweep clean egg shell particles 120 into groove 130.

It will be readily appreciated that other arrangements for a sweep arm may be provided according to the present invention. For example, a sweep arm (not shown) may be constructed and arranged to sweep back and forth over a bottom of tank 102 in a direction perpendicular to a direction of extension of the sweep arm. In this instance, a pair of grooves which are parallel to the sweep arm may be provided at opposite sides of the tank bottom, with each groove being provided with an auger.

The rotation of first auger 132 transports clean egg shell particles 120 to a second auger 136, which may be driven to rotate by one of the at least one auger motors 134 or by another auger motor (not shown). Second auger 134 is preferably disposed within a conduit 138 or the like, which is inclined in the manner shown in FIG. 1, whereby clean egg shell particles 120 are lifted upwardly above the water line in tank 102 (although this is not clearly illustrated in FIG. 1). By lifting clean egg shell particles 120 above the water line, they can be substantially drained of water.

Second auger 134 conveys the clean egg shell particles 120 to a hopper 140, through which the egg shell particles enter second recovery device 108.

Second recovery device 108 may comprise any conventional device by which the egg shell fragments are further drained and/or dried. For example, as illustrated in FIG. 1, second recovery device 108 includes a conventional conveyor belt system 142, onto which clean egg shell particles 120 are dropped from hopper 140. The conveyor belt system 142 conveys clean egg shell particles 120 through (under, adjacent, etc.) a conventional drying unit 144, such as radiant heater and/or hot air blower unit. The drying unit 144 raises the temperature within second recovery device 108 to, for example, 212° F. to promote drying.

After passing drying unit 144, clean egg shell particles 120 are dumped off of conveyor belt system 142 into another hopper 146 from which the egg shell particles are collected, for example, in a bin 148.

It will be recognized that bioactivity, biohazard, and sanitation issues are important in the method and apparatus disclosed herein according to the present invention, especially in the presence of wet egg shells and membrane. Accordingly, it is noted, especially with regard to the structural elements of the apparatus disclosed herein, that materials of manufacture must generally be chosen in accordance with applicable regulatory standards (such those of the U.S. Department of Agriculture). For example, hoppers 110 and 140, conduits and chutes 112, 122, 128, and 138 may preferably be made from stainless steel, as are tank 102, augers 132 and 136, and drying unit 144.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for separating a membrane attached to egg shells, the apparatus comprising:
    a device for abrading the linking structure attaching the membrane to the egg shells, said device constructed and arranged to output abraded membranes and egg shell particles;
    a tank containing a liquid for receiving the abraded membranes and egg shell particles, said liquid providing an environment whereby the abraded membranes and egg shell particles passively disassociate such that clean egg shell particles sink and abraded membranes remain entrained in the liquid;
    a membrane recovery device communicating with said tank; and
    an egg shell particle recovery device communicating with said tank.

2. The apparatus according to claim 1 further including an agitator constructed and arranged to displace the egg shell particles on a bottom of said tank, said agitator further constructed and arranged to release abraded membranes trapped beneath the egg shell particles and to entrain the abraded membranes into the liquid.

3. The apparatus according to claim 2 wherein the agitator is constructed and arranged to release abraded membranes trapped beneath the egg shell particles and entrain the abraded membranes into the liquid without substantially dispersing the egg shell particles into suspension within said liquid.

4. The apparatus according to claim 2, wherein said agitator is a movable arm provided at the bottom of said tank.

5. The apparatus according to claim 2, wherein said agitator comprises an aerator.

6. The apparatus according to claim 2, wherein said membrane recovery device comprises:
    a membrane extractor constructed and arranged to extract the abraded membranes from said tank;
    a suction system for suctioning and conveying the content of said tank to said membrane extractor; and
    a return communicating between said membrane extractor and said tank, wherein said agitator is said return.

7. The apparatus according to claim 1 wherein said device is arranged to output abraded membranes and egg shell particles below a surface of the liquid in said tank.

8. The apparatus according to claim 1, wherein said device is an abrasive reducing device.

9. The apparatus of claim 8, wherein said abrasive reducing device is a COMITROL® brand reducing device.

10. The apparatus according to claim 1, wherein said membrane recovery device comprises:
    a membrane extractor constructed and arranged to extract the abraded membranes from said tank;
    a suction system for suctioning and conveying the content of said tank to said membrane extractor; and
    a return communicating between said membrane extractor and said tank.

11. The apparatus according to claim 10, wherein said membrane extractor comprises a screening device.

12. The apparatus according to claim 11, wherein said screening device includes at least two screens having different mesh sizes, respectively.

13. The apparatus according to claim 11, wherein said screening device comprises a mesh conveyor belt.

14. The apparatus according to claim 10, wherein said tank includes a clean egg shell particle transport mechanism for transporting the clean egg shell particles from said tank to said clean egg shell particle recovery device.

15. The apparatus according to claim 14, wherein said clean egg shell particle recovery device comprises a drying unit for drying the clean egg shell particles transported to said clean egg shell particle recovery device by said clean egg shell particle transport mechanism.

16. The apparatus according to claim 15, wherein said clean egg shell particle transport mechanism comprises an auger device disposed in an elongate groove at a bottom of said tank.

17. The apparatus according to claim 1, wherein said tank includes a clean egg shell particle transport mechanism for transporting the clean egg shell particles from said tank to said clean egg shell particle recovery device.

18. The apparatus according to claim 17, wherein said clean egg shell particle recovery device comprises a drying unit for drying the clean egg shell particles transported to said clean egg shell particle recovery device by said clean egg shell particle transport mechanism.

19. The apparatus according to of claim 18, wherein said clean egg shell particle transport mechanism comprises an auger device disposed in an elongate groove at a bottom of said tank.

20. A method for separating a membrane attached to egg shells comprising the steps of:
    processing a size of egg shells so as to yield egg shell particles and abraded membranes, the egg shells having a linking structure that attaches the membrane to the egg shells, wherein the linking structure is abraded from the egg shell particles;
    directing the egg shell particles and abraded membranes into a tank containing a liquid, the abraded membranes passively dissociating from the egg shell particles by primarily remaining entrained in the liquid and the clean egg shell particles settling to the bottom of the tank;
    collecting the abraded membranes entrained in the liquid; and
    collecting the clean egg shell particles.

21. The method of claiming 20 further including the step of stirring the egg shell particles and abraded membranes wherein the abraded membranes are passively dissociated from said egg shell particles.

22. The method according to claim 21, wherein the step of stirring the egg shell particles and any abraded membranes trapped within said egg shell particles settled on the bottom of the tank so that the abraded membranes become substantially entrained in the liquid is accomplished without substantially dispersing the egg shell particles into suspension within said liquid.

23. The method according to claim 21, wherein said stirring step comprises agitating the settled clean egg shell particles and abraded membranes with a movable arm.

24. The method according to claim 21, wherein said stirring step comprises aerating the liquid.

25. The method according to claim 20, wherein said step of collecting the abraded membranes comprises passing the liquid in which the abraded membranes are entrained through a screen and returning the resultant clean liquid to the tank.

26. The method according to claim 20, wherein the liquid comprises water.

27. The method according to claim 20, wherein the liquid is water.

* * * * *

UNITED STATES PATENT AND TRADEMARK OFFICE
CERTIFICATE OF CORRECTION

PATENT NO. : 7,007,806 B2 Page 1 of 1
APPLICATION NO. : 10/302712
DATED : March 7, 2006
INVENTOR(S) : Joseph H. MacNeil It is certified that error appears in the above-identified patent and that said Letters Patent is hereby corrected as shown below:

Column 1, Line 13, after "CLAIM OF PRIORITY," and before "BACKGROUND OF THE INVENTION" insert the following:

-- GOVERNMENT SPONSORSHIP

This invention was made with support from the Government under USDA Hatch Act Project No. PEN03327 and PA Department of Agriculture Contract No. ME 445124. The Government has certain rights in the invention. --

Signed and Sealed this

Twenty-fifth Day of December, 2007

JON W. DUDAS
*Director of the United States Patent and Trademark Office*